United States Patent

Schippers et al.

[15] 3,642,397
[45] Feb. 15, 1972

[54] EXTRUSION MACHINES AND DIES FOR PRODUCING MULTILAYER TUBES OR FILMS

[72] Inventors: Heinz Schippers; Walter Geil; Gerd Albrecht, all of Remscheid-Lennep; Reinhold Jung, Wermelskirchen, all of Germany

[73] Assignee: Barmag Barmer Maschinenfabrik Aktiengesellschaft, Wuppertal, Germany

[22] Filed: Feb. 28, 1969

[21] Appl. No.: 803,207

[30] Foreign Application Priority Data

Nov. 14, 1968 Germany .................... P 18 08 883.0
Aug. 8, 1968 Germany .................... P 17 79 410.4

[52] U.S. Cl. .............................. 425/109, 425/326, 425/382
[51] Int. Cl. ........................................................ B29d 23/04
[58] Field of Search .................. 18/14, 13, 12 DS, 12 N, 2 F, 18/20 I, 14 P, 14 RR

[56] References Cited

UNITED STATES PATENTS

| | | | |
|---|---|---|---|
| 1,933,212 | 10/1933 | Gora | 18/13 P UX |
| 2,174,779 | 10/1939 | Delorme | 18/13 P |
| 2,844,846 | 7/1958 | Kronholm | 18/14 S |
| 3,121,255 | 2/1964 | Henning | 18/13 P |
| 3,275,725 | 9/1966 | Utz | 18/14 P UX |
| 3,419,938 | 1/1969 | Sonia | 18/14 P |

*Primary Examiner*—J. Spencer Overholser
*Assistant Examiner*—Norman E. Lehrer
*Attorney*—Johnston, Root, O'Keeffe, Keil, Thompson & Shurtleff

[57] ABSTRACT

Apparatus for producing tubular films, especially multilayer blown films, of two or more layers of the same or different plastics material, said apparatus embodying two or more screw extruders mounted on a turntable and die with at least two concentric, juxtaposed annular nozzles substantially coaxial with the axis of rotation of the turntable. Also, improved extrusion dies for production of multilayer tubes or films wherein the feed lines or passages for the plastic composition to be extruded terminate at points situated one behind the other in the axial center portion of the die. The plastic composition is fed through a plurality of radially connecting lines from said points to annular passages and ultimately to annular nozzle means in the die.

8 Claims, 6 Drawing Figures

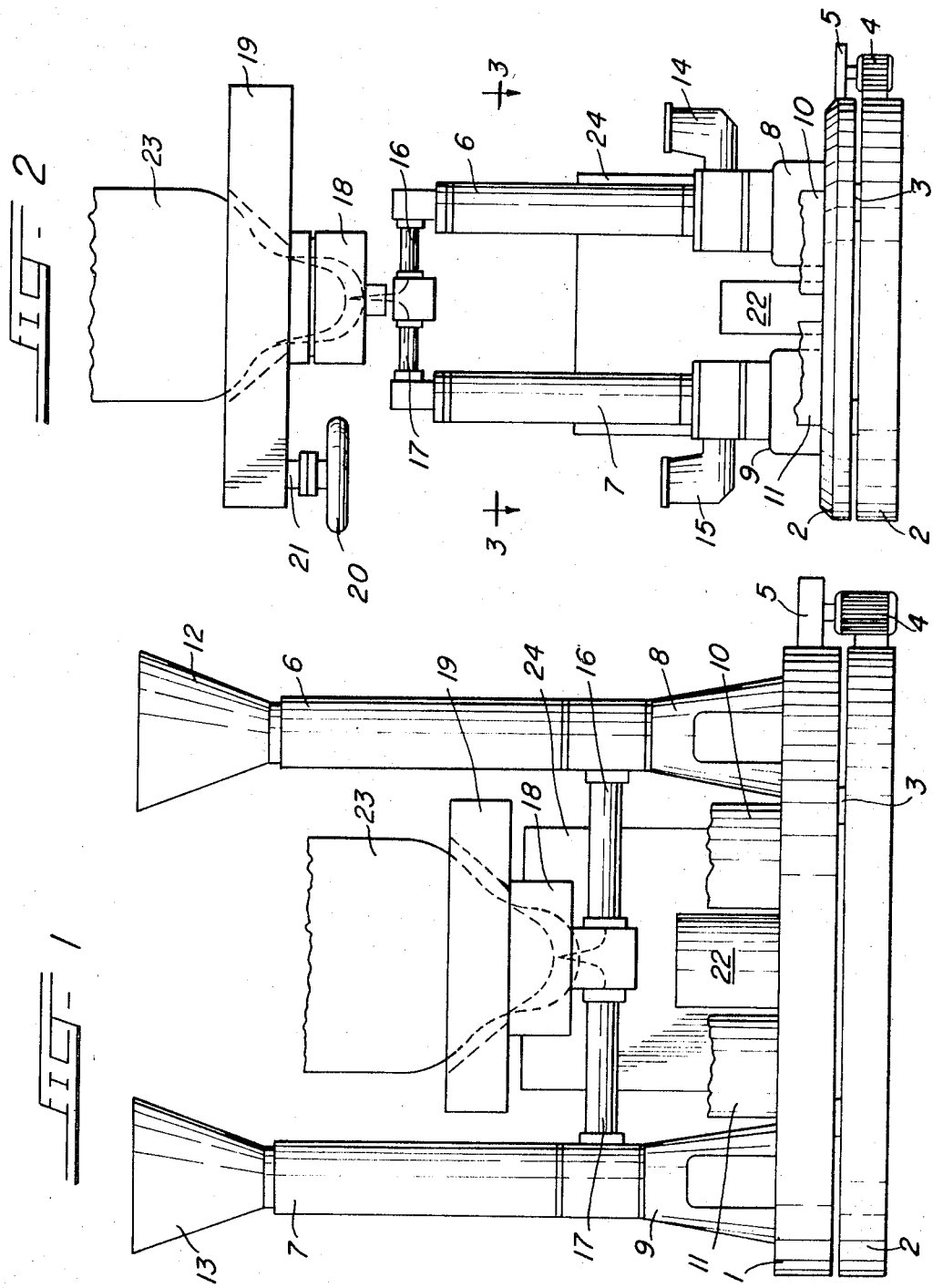

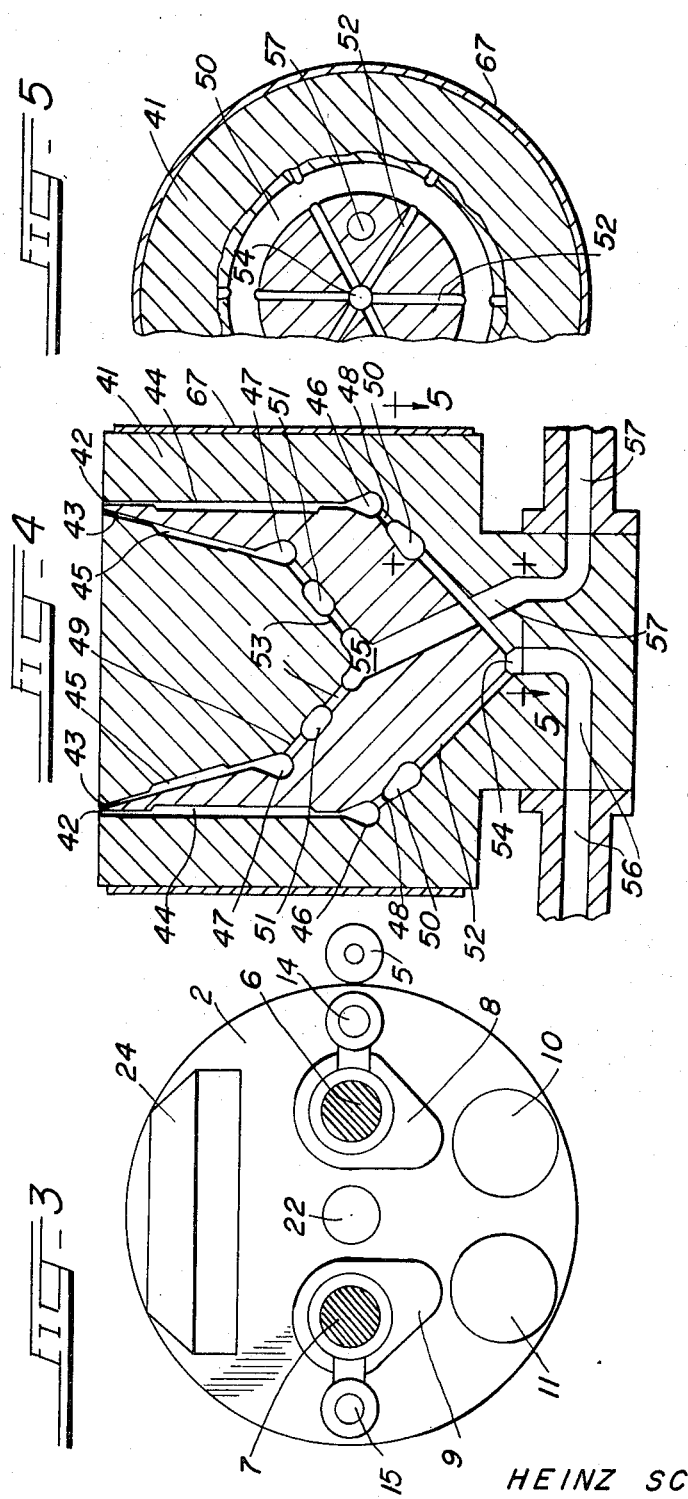

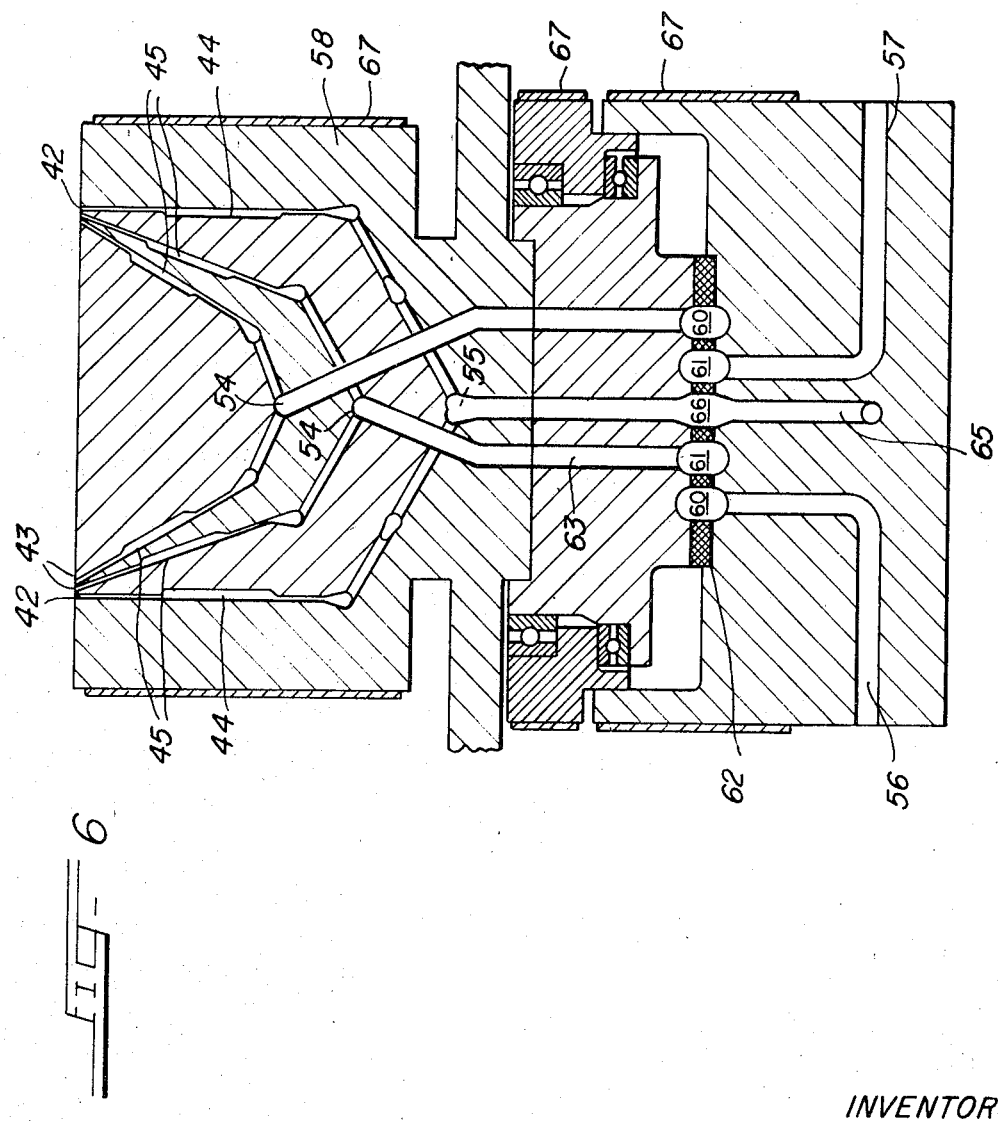

EXTRUSION MACHINES AND DIES FOR PRODUCING MULTILAYER TUBES OR FILMS

BRIEF STATEMENT OF THE INVENTION

This invention relates to extrusion machines and dies for the production of multilayer tubes or films, in particular for the production of multilayer blown films. The invention also concerns improvements in the structure of extrusion dies for producing said tubes or films.

BACKGROUND OF THE INVENTION

Extrusion machines are known in which two or more fixed screw extruders act on a common die with coaxial annular nozzles, in which case the tubular structures issuing from the nozzles are combined by inflation into composite films (cf. German Pat. No. 1,028,325 for example).

On the other hand, it is known that the production of simple blown films or tubular films involves the problem of keeping the extruded material to an equal, uniform thickness. Differences in thickness become very noticeable when the blown films or tubular films are subsequently wound up into rolls. The differences in thickness in each winding layer accumulate to produce bulges or annular "beads" over the periphery of the rolls. In order to distribute these undesirable differences in wall thickness over the entire width of the rolls, it has been proposed to design either the takeoff and winding attachment where the extrusion die is fixed, or the extrusion die or screw extruder with the die where the takeoff and winding attachment is fixed, or even both in such a way that they can be rotated relative to one another (cf. British Pat. No. 744,977). However, it has also been proposed to use for the same purpose a turntable on which that part of the apparatus to be rotated is mounted, and which is arranged in such a way as to rotate back and forth either constantly or through approximately 360° (cf. U.S. Pat. No. 2,844,846).

Dies of the subject type are known per se. They consist essentially of several tubes arranged coaxially one inside the other, opening into coaxial tubular dies. The tubes are connected through short lines to machines, usually extruders, in which the thermoplastic compositions to be injected are converted into the plastic, extrudable state. The pressure required for injection is simultaneously built up in these machines.

The thermoplastic compositions emerge from the extrusion die nozzles in the from of tubes lying coaxially one within the other and by virtue of their thermoplasticity combine together to form a composite tube either just before they emerge from the nozzle or directly after they have emerged. If a gaseous medium, for example air, under slight excess pressure, is pumped into the tube, it is possible to increase the diameter of the composite tube within wide limits, as a result of which the wall thickness of the tube decreases to such an extent that ultimately a film of the required thickness is formed. By blowing a cooling gas, usually air, on to the inner or outer surface of the tube or on to both, the tubular film is cooled during inflation and as a result solidifies. Machines of this kind are described for example in German Pat. specification No. 1,039,224.

One important factor in the production of blown films is that the layer of material issuing from the tubular dies should be as uniform as possible and equal in thickness everywhere around the die. It is only possible in this way to ensure that the blown film produced is sufficiently uniform. To satisfy this requirement, it is known that the connecting lines between the injection mold and the extruders are made identical with one another and as short as possible in length. With known molds, this is achieved by virtue of the fact that the tubes of the injection mold arranged coaxially one within the other each open into an annular duct which is connected with the extruder through a radially directed feed pipe for the plastic. In the practical application of these machines, however, it has been found that the distribution of pressure in the annular duct is not uniform over the entire periphery owing to the radial arrangement of the feed pipe. This inevitably results in the nonuniform distribution of the plastic to be injected in the mold.

BRIEF DESCRIPTION OF THE INVENTION

If multilayer blown films or tubular films are to be further processed satisfactorily, the freshly extruded product must be uniformly deposited without any distortion or creasing on to the winding spool, and experience gained in the production of single blown films should be used to this end. Accordingly, the extrusion machines of this invention for the production of multilayer blown films or tubular films consisting of two or more layers of the same, similar or different material, have two or more screw extruders with preferably vertical or substantially vertical feed screws mounted on a turntable and connected to a multilayer annular nozzle die whose central axis is coaxial with or substantially coaxial with the axis of rotation of the turntable. The takeoff and winding attachment is fixedly arranged in known manner at a distance from the die. The screw extruders may be mounted on the common turntable in such a way that they may be adjusted and then fixed in their positions and feed direction.

Basically, the screw extruders may be similar in design to those which are oriented parallel to the floor with horizontal feed screws. Considering space occupied by such machines, vertical extruders or a combination of horizontal and vertical extruders on the turntable are preferred over horizontal extruders. The vertical extruders may also be equipped with front drive in the form of so-called front-end-drive extruders.

It may be advantageous to arrange the screw extruders on the common turntable in such a way that they can be adjusted and then locked in their positions and feed direction, depending upon the type of materials to be processed, the temperature required and the design of the die used. The drive systems for the screw extruders may be arranged in known manner on the turntable. In addition, at least two screw extruders may be driven together, in particular through gear drives. The particular screw speed should be infinitely variable.

If desired, at least one of the melts may be pigmented. It is possible by means of the apparatus according to the invention to produce various combinations of layers of thermoplastic plastics of the same or different kind, optionally with varying proportions of additives such as plasticizers or the like, in whose case the individual layers do not show any differences in thickness over the entire length of the tube.

The particular advantage is that the different materials do not mix during extrusion, instead they form clearly separated layers. Adhesion of the individual layers to one another is governed essentially by the type of materials used, the heat inherent in them, the pressure prevailing inside the issuing multilayer tube and by the respective degrees of cooling and solidification around the outer periphery. Depending upon the type of materials to be processed, the various layers may coalesce in the die itself, at its nozzle openings or after they have emerged from the die.

Turning now to the dies per se, they are designed for the production of multilayer tubes or films which are symmetrical, of uniform wall thickness, and are free from other differences resulting from nonuniform distribution of the extrudable composition or compositions.

According to the invention, these objectives may be achieved by extrusion dies with concentric, annular extrusion nozzles of the kind described above, in which dies all feed ducts terminate at points in the axially center part of the die and lie axially one behind the other. The points are connected with respective annular, ringlike ducts or passages through a plurality of connecting lines in radial arrangement thereto. By virtue of this arrangement, each annular duct or passage is connected through lines of approximately equal length with the end of the supply line associated with it, all the terminal points of which lines are lying in the axially center part of the die, whereby substantially identical flow conditions prevail at every point along the annular ducts or passages. All the supply lines can be continued up to points in the middle of the mold or die because these points are connected through radially extending individual lines with the annular ducts. The supply line for the nozzles situated further inwards may therefore pass through between the radially extending connecting lines associated with the outer nozzles.

For reasons of attaining flow of the extrudable plastics, it is advisable that the connecting lines or passages extend conically from the aforesaid terminal ends of the supply lines to the respective annular, ring-shaped passages. The annular lines or passages themselves should have a greater cross-sectional area than the individual connecting lines, so that the flowing composition is stabilized in the annular lines, making the composition more uniform and equalizing the pressure. In order to enhance this effect, the several annular passages are arranged one behind the other in the direction of flow, in which case the number of connecting lines increases with advantage from annular passage to annular passage.

According to another aspect of the invention, and utilizing the basic concept of the invention, there is provided an apparatus in which the feed lines initially open into annular passages extending coaxially of the die axis. These annular passages in turn are connected to supply line terminal points situated one behind the other along the die axis. With an arrangement such as this, it is possible to design those components situated downstream of these annular lines in the working direction in such a way as to be rotatable about the die axis, thus enabling the nozzle head of the extrusion die to be rotated, while the die-connecting socket or base is firmly anchored in the stationary machine frame. A seal preferably of polytetrafluoroethylene or another abrasion-resistant sealing material, is arranged with advantage between the stationary feed parts and the rotating parts.

DESCRIPTION OF PREFERRED EMBODIMENTS

The preferred embodiments of the invention described above are described hereinafter in conjunction with the illustrations thereof in the drawings, wherein:

FIG. 1 is a front elevation of an extrusion machine with its screw extruders mounted on a turntable, the screw extruders being driven by a front-end drive at the output or discharge end of the extruder;

FIG. 2 is a front elevation of a second embodiment using screw extruders driven at the feed end;

FIG. 3 is a section view taken on section plane 3—3 of FIG. 2;

FIG. 4 is a diametric section through one embodiment of the injection die according to the invention;

FIG. 5 is a cross section on the section 5—5 of FIG. 4; and

FIG. 6 is a diametric section through another embodiment of an injection die according to the invention in which the nozzle head is rotatable about the die axis.

The two embodiments of the double screw extruders of FIGS. 1 and 2 consist essentially of the same components. The turntable 1 is rotatably mounted in known manner on the machine base or bed plate 2 anchored to the floor. In FIGS. 1 and 2, the rolling elements are shown in the form of rollers or ball bearings 3. The drive 4 for the turntable 1 is fixedly mounted on the machine bed plate 2, in which case the drive pinion 5 meshing with the teeth of the turntable may be directly mounted on the drive shaft. The drive for the turntable 1 may also be mounted inside the bed plate 2 in which case the turntable 1 will be provided with an inner gear ring.

In the embodiments shown, the screw extruders 6 and 7 together with their gear systems 8 and 9 are arranged vertically on the turntable 1. The screws of the two extruders 6 and 7 may be driven by a common motor, or each by its own motor. The second of these two alternative drive systems has been selected, purely by way of example, for illustration. For the sake of clarity, the motors 10 and 11 preceding the screw extruders 6 and 7 on the turntable 1 in FIGS. 1 and 2 have only been indicated in fragment.

As shown in FIGS. 1 and 2 various types of extruders may be used. According to FIG. 1, two so-called front-end-drive extruders are mounted on the turntable 1 as screw extruders 6 and 7. The screw in this type of extruder, known per se, is driven at its output end, and the feed hoppers 12 and 13 are arranged to sit axially atop the extruder barrel. In the embodiment of FIG. 2, the conduits 14 and 15 for the feed to the extruders of the plastic composition extend radially from the sides of the extruders at their driven ends.

As illustrated, the two screw extruders 6 and 7 may be arranged on a common diameter of the turntable 1 or even at a varying distance from the axis of rotation of the turntable, in which case the melt feeds 16 and 17, in the example shown, extend radially of the axis of rotation of the turntable 1 and also enter radially into the multilayer annular nozzle die 18. The latter is in the form of a tubular-film blowing head and is arranged centrally over the turntable 1. If necessary, it would also be possible to arrange even more than two screw extruders with a common film blowing head on the turntable 1. Accordingly, the film extrusion and blowing apparatus is a two-component or multiple-component die 18. A cooling ring 19 may be fixedly connected with the nozzle die 18 and accordingly rotates therewith and the screw extruders 6 and 7 about the axis of rotation of the turntable 1. The fan 20 for producing the cooling air may be discharged by the cooling ring against the extruded, tubular film mounted on to the cooling ring 19 itself, or alternatively may even be mounted on the turntable 1 and connected through a rigid or flexible line with the connecting socket 21 of the cooling ring 19.

Arranged centrally in the turntable 1 is the usual opening 22 for supplying the apparatus with air, water and electricity. Air is required to inflate the tubular film 23. The feed pipe may be guided coaxially of the turntable from the opening 22 to the film-blowing head 18, although it may also be guided radially out of the opening 22 and passed through for example between barrel and insulating jacket of one of the two screw extruders 6 and 7 (FIG. 2), in which case it may be joined radially to the die 18, running parallel to one of the melt feed pipes 16 and 17. Water and electricity are required for cooling and heating the various heating zones along the barrel of the two screw extruders 6 and 7. Electricity is also required for driving the screws and the fan. Some of the electricity is supplied through the control console 24 also arranged on the turntable for the purposes of control and regulation. For the sake of clarity, the supply lines for air, water and electricity, have not been shown in the drawings.

In order to counteract any strain upon the anchorages connecting the extruder to the turntable, attributable to thermal expansion when the screw extruders 6 and 7 are started up, prismatic bearings (not shown) may be provided either in or on the turntable 1, in which free rollers or rounded counterelements attached to the extruder may readily be adjusted through a small angle and then locked in position.

The winding attachment for the film (not shown) may be fixedly arranged on a frame provided for this purpose above the apparatus described, or even alongside the turntable, in which case the film having been combined above the cooling ring is deflected downwards by any appropriate known device. The turntable may either be rotated continuously in the same direction, or alternately in rotary oscillation.

Referring now to FIGS. 4–6, the die 41 has two ring-shaped nozzles 42 and 43 arranged coaxially in close proximity, one within the other. Each of the two annular nozzles communicates with ring-shaped passages 44 and 45 arranged coaxially, one within the other. In the embodiment shown, the inner passage 45 is inclined slightly towards the outer passage 44.

The passages 44 and 45 terminate in annular or ring-shaped ducts 46 and 47. These annular ducts are connected through a plurality of diagonally radial connecting lines 48 and 49 with further annular or ring-shaped ducts 50 and 51, which in turn communicate through a plurality of connecting lines 52 and 53 with the ends 54 and 55 of the supply lines 56 and 57. By virtue of the diagonally radial arrangement of the connecting lines 52, it is possible to pass the supply line 57 between them and also to continue it to an end point 55 which is situated exactly in the middle of the die and accordingly behind the end point 54 axially in the working or extrusion direction. FIG. 5 shows the radial arrangements of the lines 52, and also the position of the supply line 57 relative thereto.

FIG. 6 shows another embodiment of the apparatus according to the invention in which the nozzle head 58 is rotatable about the working axis, while the feed part or base 59 is stationary and hence can be connected with the stationary machine frame. In addition, the embodiment of the injection die shown in FIG. 6 enables three components to be processed to form a composite tube or composite film.

To make the nozzle head 58 rotatable the supply lines 56 and 57 first have to be guided to annular or ring-shaped passages 60 and 61 arranged coaxially one within the other. These annular passages consist of recesses machined into the opposing faces of the fixed feed part 59 and the rotatable nozzle head 58, i.e., in the slide faces between the fixed and rotatable parts. As already mentioned, it is of advantage to arrange between the fixed feed part 59 and the rotatable part 58 a seal 62 which may consist for example of polytetrafluoroethylene or even of sintered bronze or any other suitable material. The annular passages 60 and 61 are then connected through lines or passages 63 and 64 with the end points 54 and 55 from where the passage and nozzle system continues as already described in reference to FIG. 4.

The third component included in this case is introduced through the axially inserted supply line 65. By virtue of the fact that this line is axially oriented, there is no need in this case to interpose another annular line although it is of course possible as indicated to widen it somewhat at the portion 66 in the area of the slide faces, should this prove necessary for reasons of flow.

As with conventional dies, the injection dies according to the invention may be provided outside with a heating sleeve 67. Due to the extensive symmetry of the line system and by virtue of the high degree of uniformity thus obtained in the individual layers, the dies according to the invention are particularly suitable for the production of extremely thin films.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

For example, the extrusion dies shown in FIGS. 4–6 advantageously may be used for the extrusion die designated 18 in FIGS. 1 and 2, but they may be used on other extrusion apparatus as well. The rotatable die of FIG. 6 may be mounted on the apparatus of FIGS. 1 and 2 or on any extrusion apparatus with the base stationary and the nozzle head rotatable with the turntable in order to produce the desired rotation of the nozzle.

We claim:

1. An apparatus for the continuous production by extrusion of blown films or tubular films consisting of two or more layers of the same, similar or different extrudable plastic material comprising two or more screw extruders mounted together on a turntable, and an extrusion die with at least two coaxial, ring-shaped extrusion nozzles mounted on said turntable with its axis substantially coaxial with the axis of rotation of the turntable, and means for feeding said material from said extruders to respective ring-shaped extrusion nozzles, said die being adapted for the production of multilayer tubes or films and comprising a die body having a plurality of separate feed passages for feeding thereinto the plastics composition to be extruded, said die body also having a plurality of ring-shaped or annular passages arranged coaxially therein, passage means connecting respective annular passages with respective ring-shaped nozzles of said die body, said feed passages having terminal ends situated axially one behind the other in axial center portion of said die body, and a plurality of radial connecting passages communicating said terminal ends with respective annular passages.

2. An apparatus as claimed in claim 1, wherein the screw extruders have substantially vertical feed screws.

3. An apparatus as claimed in claim 1, wherein drive means for said screw extruders are mounted on said turntable.

4. An apparatus as claimed in claim 3, wherein at least two screw extruders have a common drive.

5. An apparatus as claimed in claim 1, wherein said connecting passages extend diagonally from said terminal ends to said respective annular passages.

6. An apparatus as claimed in claim 1, wherein said die comprises a base and a head, means mounting said head and said base for relative rotation, opposing faces on said head and said base, said faces having formed therein annular passages coaxial the axis of rotation of said die, and said feed passages respectively intercepting said annular passages.

7. An apparatus as claimed in claim 6, wherein a seal of polytetrafluoroethylene or other seal material is provided between said faces.

8. An apparatus as claimed in claim 1 wherein said annular passages are located in said die body in successively different, transverse planes in the axial direction of said die body.

* * * * *